United States Patent [19]

Tanner

[11] 4,125,637
[45] * Nov. 14, 1978

[54] PROCESS FOR EMBEDDING HARD PARTICLES IN A BEARING SURFACE

[75] Inventor: John E. Tanner, Wolverhampton, England

[73] Assignee: Laystall Engineering Company Limited, England

[*] Notice: The portion of the term of this patent subsequent to Jun. 1, 1993, has been disclaimed.

[21] Appl. No.: 782,940

[22] Filed: Mar. 30, 1977

[30] Foreign Application Priority Data

Apr. 2, 1976 [GB] United Kingdom ............... 13545/76

[51] Int. Cl.² .......................... B05D 5/00; F16C 33/24
[52] U.S. Cl. .......................... 427/198; 29/149.5 NM; 29/156.4 WL; 51/290; 51/318; 308/239; 308/241; 427/199; 427/201; 427/232; 427/234; 427/276; 427/277; 427/289; 427/292; 427/356; 427/359; 427/369

[58] Field of Search ............... 427/292, 234, 199, 198, 427/201, 204, 289, 275, 277, 239, 369, 232, 276, 356, 359; 29/156.4 WL, 149.5 NM; 51/290, 295, 318; 308/239, 241

[56] References Cited

U.S. PATENT DOCUMENTS

| | | | |
|---|---|---|---|
| 2,577,818 | 12/1951 | Shaw | 29/149.5 R |
| 3,808,955 | 5/1974 | Hamada et al. | 29/156.4 WL |
| 3,961,104 | 6/1976 | Tanner | 427/199 X |

Primary Examiner—Ronald H. Smith
Assistant Examiner—Evan K. Lawrence
Attorney, Agent, or Firm—Rose & Edell

[57] ABSTRACT

In a process for forming an extremely hard-wearing rubber or bearing surface on a metal machine part, particles of hard grit, such as carbide grit, are deliberately formed into the surface using a resiliently-loaded tool, so that the surface becomes permanently impregnated with the hard particles. During the operation the particles can conveniently be contained in a slurry that flows over the surface. After impregnation, a lapping operation is performed on the impregnated surface using a fine carbide grit.

13 Claims, 5 Drawing Figures

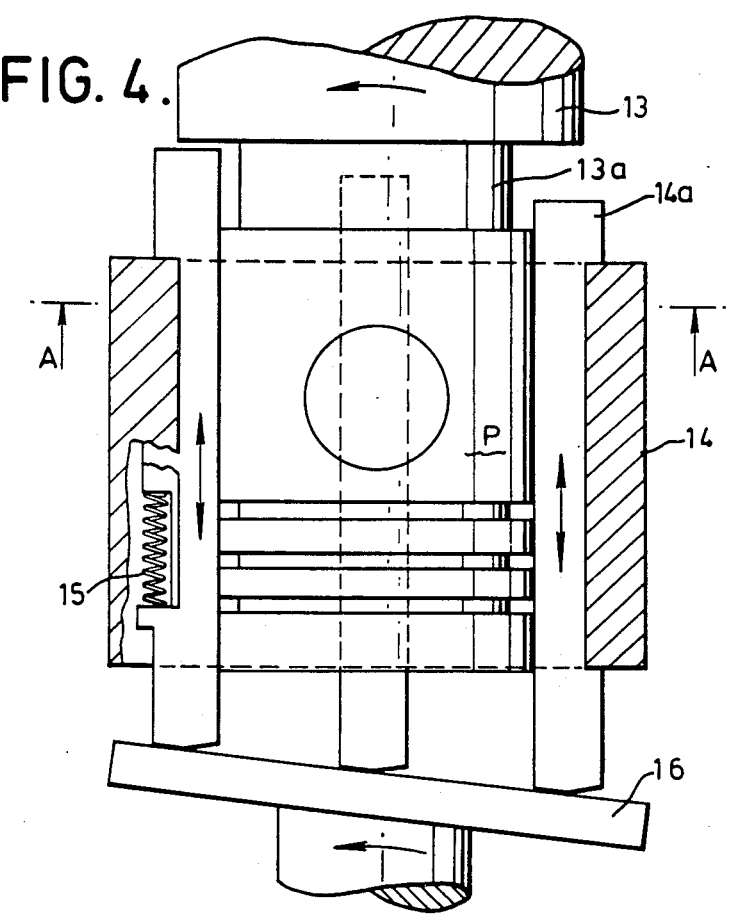
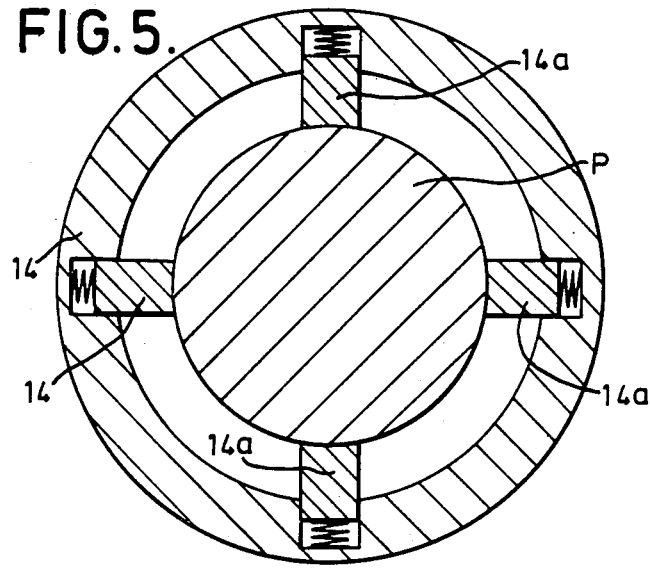

PROCESS FOR EMBEDDING HARD PARTICLES IN A BEARING SURFACE

BACKGROUND OF THE INVENTION

This invention relates to the treatment of metal machine surfaces and especially bearing and relatively-sliding surfaces. It is an object of the invention to achieve metal surfaces that are extremely hard-wearing and durable under conditions of arduous duty.

One example of a situation where extremely hard-wearing metal surfaces are required is the bores of cylinder liners for internal combustion engines. Many prior processes have been devised for the treatment of such surfaces to improve their quality and durability but nevertheless there is a strong need for a better process since cylinder liners in some instances have an undesirably short life.

It is a well known technique, in the treatment of machine parts, to bore or lap metal surfaces making use of an abrasive powder composed of hard grains or grit particles, e.g. silicon carbide particles. However, it has been considered as vital to remove all trace of the abrasive powder after such treatment since to leave any residue of these exceptionally hard particles would lead to rapid wear and deterioration of the treated surface in use.

SUMMARY OF THE INVENTION

According to the present invention, the surface of a metal machine part is deliberately impregnated with particles of hard grit forced into the surface so as to become permanently embedded therein, which step is followed by final lapping with a fine carbide grit. The impregnated particles of silicon carbide or other very hard material remain in the surface of the component during its life-time as a machine part. Contrary to prior belief, we have discovered that the presence of the silicon carbide grains or grit particles does not result in rapid deterioration in the surface in use or damage to mating parts but considerably improves the wear-resistance and durability of the surface.

One particularly surprising aspect is that the grit particles do not come loose, as might perhaps be expected, with wearing of the relatively softer metal matrix in which the particles are embedded but instead the hard particles remain firmly locked into the metal.

In some cases, the simplest way of impregnating a metal surface with these hard particles is to embed the dry particles by impacting them into the metal. This is appropriate in the case of a metal such as aluminium. However, in the case of, say, cast iron or steel it is preferred to work the particles into the surface by flowing a suspensions of graded particles in a lapping oil over the surface and applying pressure by means of a spring-loaded roller or other resiliently-loaded tool, such as a bladed lapping tool.

In the instance of a cylinder liner, as well as rendering the surface hard and durable it is necessary to provide oil-retaining grooves. This can be done as a separate operation; but it is found advantageous to combine the two steps and employ a suspension of graded silicon carbide or similar hard particles and a lapping tool in a treatment that brings about cutting of the oil-grooves by the hard particles and also embedding of those same particles in the metal surface. This can be achieved by reciprocating the lapping tool in the cylinder liner bore with a repetitive helical motion such as to produce the desired criss-cross helical grooves. One or more subsequent similar treatments with hard particles graded to a smaller grain size are essential to obtain the best finish.

A special benefit discovered in applying the invention to cylinder liners is that it reduces or prevents instances of ovality.

The preferred powder or grit being silicon carbide, it is desirably of small grain size and free as far as possible from sharp peaks. The method according to the invention is not intended to size the cylinder bore or other component as there is no appreciable stock or surface removal, the powder or grit entering, and, if desired, grooving, the surface. Thus, the treatment can be applied to engine cylinder blocks, wet and dry type cylinder liners and pistons, as well as to a variety of other machine surfaces where resistance to wear and durability are paramount.

The embedded particles virtually form the bearing surface and provide a large proportion of such surface area, e.g. 50%.

BRIEF DESCRIPTION OF THE DRAWINGS

Processes of treatment according to the invention will now be described in more detail, by way of example, with reference to the accompanying diagrammatic drawings. In the drawings:

FIG. 4 shows in side view a lapping tool for treating a piston, and FIG. 5 is a sectional plan of the tool of FIG. 4.

DESCRIPTION OF THE PREFERRED EMBODIMENTS

Figure 1:
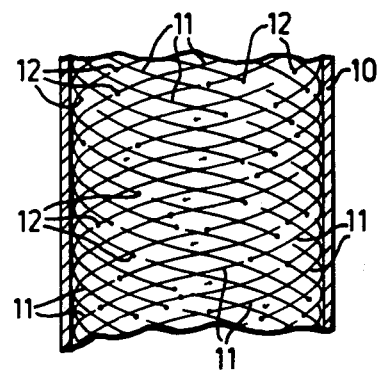
FIG. 1 is a longitudinal section of part of a cylinder liner.
Figure 2:
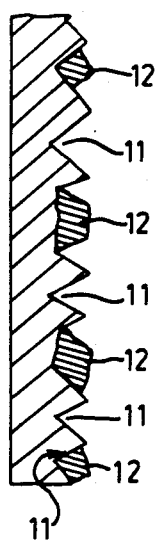
FIG. 2 is a fragmentary section through the cylinder wall, after particle embedment.
Figure 3:
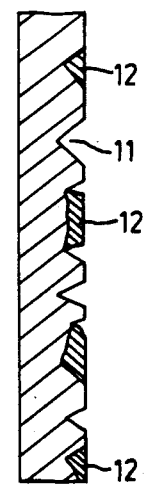
FIG. 3 is a view similar to FIG. 2 after the finishing operation.

Referring firstly to FIGS. 1 to 3, it will, in the first place, be understood that these views are purely diagrammatic, bearing in mind that in practice the grooves shown are close-spaced and of a depth and width of between 0.001 and 0.003 mm and the particles can constitute a large proportion of the final surface area. The cylinder 10 will be set up for operation upon it by a conventional lapping tool with outwardly spring-loaded lapping blades, the tool being simultaneously rotated about and reciprocated along the cylinder axis, whilst a slurry of hard particles is poured in at the top of the cylinder, collected at the bottom and re-cycled. The grit (silicon carbide) is of a screen size in the region of 220. The operation results in the grit particles cutting grooves 11 on helical paths and of opposite hands to produce a criss-cross diamond pattern.

An initial run with a light tool pressure, e.g. 10 p.s.i. or less, may be done to start grooving without substantial particle embedment, and subsequently the pressure increased so that the particles increase the groove depths and widths and finally become embedded as at 12. Generally, a particle is embedded at the end of a non-continuous groove and a following particle may then commence to cut a following groove. The initial pressure can, if desired, be great enough to result in embedment without prior grooving, i.e. the one operation both grooves and embeds the particles, it being understood that the pressure used will be dependent mainly on the material of the cylinder.

The operation results in the production of a great number of helical grooves and the embedment of a great number of particles. The grooves may be continuous or some may extend only around a part of the surface, the length of time the operation is carried out and the pressure being determining factors. Suitable speeds of rotation and reciprocation of the tool are approximately 170 r.p.m. with five cycles of reciprocation per minute.

A fragmentary section of the cylinder after the above operation is shown in FIG. 2. As will be seen, particles 12 are embedded in grooves 11, some of which particles may project slightly from the general surface. In many applications surfaces so treated are acceptable, but preferably the surface is subjected to a second similar operation but using a grit of smaller size (screen size 400–500). This second operation, carried out at a higher pressure of, say, 16 p.s.i., has the effect of smoothing off the peaks of the cylinder surface between grooves and removing sharp edges of particles; and it also tends to force embedded particles, if projecting, further into the surface. Moreover, it is found that should any particles be loosely embedded by the first operation, the second operation will either lock them in the surface or remove them. FIG. 3 shows a finished surface part which is generally flat, but is grooved and has a multiplicity of close-spaced hard wearing particles locked therein.

After the second treatment, the surface is lapped in a final lapping operation using finer carbide grit, i.e. 1000 to 1 inch mesh. Polishing, cleaning and degreasing may also be carried out.

As previously indicated the invention can be applied to other machine surfaces, for instance outward-facing bearing surfaces such as those of pistons. As shown in FIGS. 4 and 5, a piston P is mounted on a rotary member 13 by locating member 13a to rotate with the member 13. The piston is concentrically within a stationary holder 14, which carries a plurality of lapping blades 14a springloaded inward toward the piston surface. The blades can also move axially with respect to the holder and are spring-loaded downwardly by springs 15. They are reciprocated by a swash plate 16 against the return action of the spring 5.

The slurry of hard particles is poured in between the holder and piston and is re-cycled and the rotary plus reciprocating action produces the criss-cross grooving and particle embedment.

It will be understood that in an arrangement of lapping blades to treat internal cylindrical surfaces as shown in FIG. 1, the blades are disposed radially outward of the holder. Preferably, in that case the cylinder is stationary and the holder both rotates and reciprocates, as already indicated.

It is also possible, as already mentioned, to press the particles into a surface using a spring-loaded roller or rollers, forcing in the particles by a rotary action, or rotary and reciprocating action, relative to the surface under treatment. Further, a lapping tool with flexible or rigid lapping blades with a negative or positive leading edge rake angle can be used with advantage in particular instances.

The silicon carbide grit or particles can be poured as a solid/liquid suspension of, say, 14lbs of carbide to 1½ gallons of lapping oil; or alternatively the surface to be treated can be pre-coated with particles applied as a paste.

An important advantage of the invention is that components of mild steel or of malleable or soft iron of low quality can be treated so as to produce components with satisfactory hard wearing bearing surfaces, as it is the embedded particles which constitute the effective bearing surface of a component.

It will be understood that when the particles to be embedded are carried in suspension in a recirculated lapping oil, as described, the circulating medium must be renewed quite often since it progressively loses its particle content. The suspension must also be very thoroughly agitated.

What I claim is:

1. A process of treating a metal surface of a machine part, especially a rubbing or bearing surface, comprising a first operation of deliberately impregnating the machine part surface with particles of a hard grit, harder than said metal surface, by mechanically forcing the grit into the surface so as to become permanently embedded therein, the operation being carried out at ordinary ambient temperatures using a resiliently-loaded tool to force in the particles and a further operation of lapping the impregnated surface using a fine carbide grit.

2. A process according to claim 1, wherein in said further operation carbide grit of 1000 to 1 inch mesh size is employed.

3. A process according to claim 1, wherein said hard grit particles are formed into the surface by flowing a suspension of graded particles in a liquid over the surface, and applying pressure by means of a resiliently-loaded tool that is moved in a repetitive cycle of motion over the surface.

4. A process according to claim 3, said repetitive cycle of motion is a repetitive helical motion such as to produce criss-cross grooves in the surface.

5. A process according to claim 3, wherein the hard grit is silicon carbide and the liquid in which it is suspended is a lapping oil.

6. A process according to claim 3, wherein the tool is a lapping tool with spring-loaded blades.

7. A process according to claim 3, wherein said first operation comprises two treatments of the surface carried out in sequence, the second with hard particles graded to a smaller grain size than the first.

8. A process according to claim 7, wherein said second treatment is carried out at a higher pressure than the first, such that the surface is grooved in the first treatment and has particles embedded in it in the second treatment.

9. A process of treating a cylindrical bore surface of a metal machine part, comprising, in a first operation, mounting the part with the bore axis vertical and operating on the surface with a lapping tool having resilient-loaded lapping blades that are both rotated about and reciprocated along said axis relatively to said bore while a suspension or slurry of hard graded grit particles in a lapping fluid is simultaneously poured in at the top of the bore to flow over said surface, the grain size of the grit particles and the pressure of the tool blades being so chosen as to embed grit particles permanently in said surface; followed by, in a further operation, lapping of the grit-loaded surface using a fine grit.

10. A process according to claim 9, wherein the first operation is carried out in two stages, the tool pressure being higher and the grain size smaller in the seond stage than in the first.

11. A process according to claim 10, wherein the screen sizes of the grit grains are in the region of 220 and in the range 400–500 in said two stages, respectively.

12. A process according to claim 10, wherein the tool pressures in said two stages are in the region of 10 p.s.i. or less and 16 p.s.i., respectively.

13. A process according to claim 10, wherein the tool is rotated at approximately 170 r.p.m. and reciprocated at about five cycles per minute.

* * * * *